(12) United States Patent
Matsumura et al.

(10) Patent No.: US 8,243,061 B2
(45) Date of Patent: Aug. 14, 2012

(54) IMAGE PROCESSING APPARATUS AND METHOD OF CONTROLLING OPERATION OF SAME

(75) Inventors: Dai Matsumura, Kawasaki (JP); Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 12/047,697

(22) Filed: Mar. 13, 2008

(65) Prior Publication Data

US 2008/0231631 A1 Sep. 25, 2008

(30) Foreign Application Priority Data

Mar. 22, 2007 (JP) .................................. 2007-075398

(51) Int. Cl.
*G06T 15/00* (2011.01)
(52) U.S. Cl. ....................................................... 345/419
(58) Field of Classification Search ........... 354/419–420
See application file for complete search history.

(56) References Cited

U.S. PATENT DOCUMENTS

| | | | | |
|---|---|---|---|---|
| 6,126,548 A * | 10/2000 | Jacobs et al. | ..................... | 463/42 |
| 6,677,946 B1 * | 1/2004 | Ohba | ............................ | 345/426 |
| 6,897,865 B2 * | 5/2005 | Higashiyama | ................ | 345/426 |
| 7,127,381 B2 * | 10/2006 | Forest et al. | ....................... | 703/2 |
| 2004/0179009 A1 * | 9/2004 | Kii | ................................ | 345/421 |

FOREIGN PATENT DOCUMENTS

JP 2003-109035 A 4/2003

OTHER PUBLICATIONS

"Collision Detection in Interactive 3D Environments" by Gino Van Den Bergen, Morgan Kaufmann Pub; ISBN: 155860801X.
A Fast Procedure for Computing the Distance Between Complex Objects in Three-Dimensional Space. E.G. Gilbert, D.W. Johnson and S.S. Keerthi, IEEE Journal of Robotics and Automation, vol. 4, No. 2, pp. 193-203, 1988.
The above reference was cited in a Sep. 22, 2011 Japanese Office Action, which is enclosed without English Translation, that issued in Japanese Patent Application No. 2007-075398.

* cited by examiner

*Primary Examiner* — Xiao M. Wu
*Assistant Examiner* — Charles Tseng
(74) *Attorney, Agent, or Firm* — Cowan, Liebowitz & Latman, P.C.

(57) ABSTRACT

In an image processing method of determining the positional relationship among virtual objects in virtual space and generating a virtual shadow of the virtual objects, a plurality of virtual objects are rendered in a first plane to which a first axis passing through a virtual light source is normal, and the positional relationship among the plurality of virtual objects is determined based upon the result of rendering acquired. Shadow information of the plurality of virtual objects is generated using the result of acquired rendering.

10 Claims, 7 Drawing Sheets

IMAGE PROCESSING APPARATUS AND METHOD OF CONTROLLING OPERATION OF SAME

BACKGROUND OF THE INVENTION

1. Field of the Invention

The present invention relates to an image processing apparatus for executing processing to render a three-dimensional model in virtual space and to a method of controlling this apparatus.

2. Description of the Related Art

Rendering techniques whereby three-dimensional virtual space that has been constructed within a computer is generated as a realistic image of the kind captured by a camera are known in the art. One of these rendering techniques is a shadow-casting technique for rendering a virtual shadow of a virtual object, which is illuminated by a virtual light source within virtual space, in order to express a light environment that is closer to reality. Although there are various methods of practicing the shadow-casting technique, the stencil shadow method and depth buffer method are available as techniques that afford a higher degree of realism. These techniques both necessitate two-stage rendering processing referred to as "two-pass rendering". For example, the first and second stages in the case of the depth buffer method are as follows:

First stage: find an area that becomes a shadow when a virtual object is viewed from a virtual light source.

Second stage: perform shadow casting by mapping the area of the shadow, which has been obtained in the first stage, when an image as viewed from the camera viewpoint is generated.

On the other hand, there is a collision check technique for checking whether virtual objects are contacting each other in three-dimensional virtual space constructed within a computer. For example, in the case of a simulation game that uses the collision check technique, contact between the character of a player and an obstacle can be determined, thereby enabling the character to avoid penetrating the obstacle. Information relating to collision check is described in "Collision Detection in Interactive 3D Environments" (by Gino Van Den Bergen, Morgan Kaufmann Pub; ISBN: 155860801X).

Generally, processing is divided into two stages, namely interference detection and collision detection, in the collision check as well. Interference detection refers to processing for determining whether virtual objects in virtual space are overlapping each other, that is, processing for determining, at high speed, whether there is a possibility that virtual objects are interfering with each other. Collision detection refers to processing, which is applied to a pair of virtual objects for which the possibility of interference has been determined from the results of interference detection, for determining in greater detail whether the shapes of the virtual objects are interfering with each other.

However, both shadow-casting processing and the collision check technique involve a large computation load. With regard to shadow-casting processing, there are various methods of performing shadow casting in virtual space. Basically, however, regardless of the method, if the shape of a shadow or precision such as grain is sought, then the computation load increases correspondingly. For example, when highly realistic shadow casting is performed, as mentioned above, two-pass rendering generally is carried out. With a method that carries out two-pass rendering, rendering is literally performed two times. The result is increased computation load.

Further, in relation to the collision check technique, if virtual space is simulated with accompanying execution of collision check processing, the most common situation is one in which a number of virtual objects that move dynamically in virtual space exist and the collision check is performed with regard to each of these virtual objects. Furthermore, there are many cases where a virtual object in virtual space is given a complicated shape (often polygonal) in order to express realism in virtual space to the maximum extent. An enormous computation load is required in order to perform the collision check under these conditions.

In a case where a shadow-casting function and collision check function are used conjointly in virtual space rendering processing, it is difficult for these to be computationally executed in real-time for the reasons set forth above.

SUMMARY OF THE INVENTION

In accordance with a representative embodiment of the present invention, there are provided an image processing apparatus and method that make possible the high-speed execution of a plurality of processes that utilize the results of rendering. In accordance with this image processing apparatus and method, it is possible to implement virtual-space presentation processing in which computational processing can be executed at high speed even in a case where a shadow-casting function and collision check function are used conjointly.

According to one aspect of the present invention, there is provided a method of controlling an image processing apparatus for determining a positional relationship among virtual objects in virtual space and generating a virtual shadow of the virtual objects, the method comprising:

a first rendering step of rendering a plurality of virtual objects in a first plane to which a first axis passing through a virtual light source is normal;

a determining step of determining the positional relationship among the plurality of virtual objects based upon a rendering result acquired at the first rendering step; and a generating step of generating shadow information of the plurality of virtual objects based upon the rendering result acquired at the first rendering step.

According to another aspect of the present invention, there is provided a method of controlling an image processing apparatus for rendering a virtual object in virtual space, comprising:

a rendering step of rendering a plurality of virtual objects, which are contained in virtual space, in one or a plurality of planes in order to execute first processing relating to the plurality of virtual objects;

a first executing step of executing the first processing based upon a rendering result acquired at the rendering step; and a second executing step of executing second processing, which relates to the plurality of virtual objects and is different from the first processing, based upon the rendering result acquired at the rendering step.

Also, according to another aspect of the present invention, there is provided an image processing apparatus for determining a positional relationship among virtual objects in virtual space and generating a virtual shadow of the virtual objects, the apparatus comprising:

a first rendering unit configured to render a plurality of virtual objects in a first plane to which a first axis passing through a virtual light source is normal;

a determining unit configured to determine the positional relationship among the plurality of virtual objects based upon a rendering result acquired at the first rendering unit; and a generating unit configured to generate shadow information of the plurality of virtual objects based upon the rendering result acquired by the first rendering unit.

Furthermore, according to another aspect of the present invention, there is provided an image processing apparatus for rendering a virtual object in virtual space, comprising:

a rendering unit configured to render a plurality of virtual objects, which are contained in virtual space, in one or a plurality of planes in order to execute first processing relating to the plurality of virtual objects;

a first executing unit configured to execute the first processing based upon a rendering result acquired by the rendering unit; and a second executing unit configured to execute second processing, which relates to the plurality of virtual objects and is different from the first processing, based upon the rendering result acquired by the rendering unit.

Further features of the present invention will become apparent from the following description of exemplary embodiments (with reference to the attached drawings).

DESCRIPTION OF THE EMBODIMENTS

Preferred embodiments of the present invention will now be described in detail in accordance with the accompanying drawings.

[First Embodiment]

A virtual-space presentation apparatus according to a first embodiment of the present invention shares results of rendering in processing for generating virtual shadow information in a shadow-casting function and processing for interference detection in a collision check function. By virtue of such sharing, it is possible to efficiently execute the processing involved in collision check applied to three-dimensional virtual objects in three-dimensional virtual space and the processing involved in the rendering of virtual shadows of these three-dimensional virtual objects. In the description given below, it is assumed that "model data" expresses a three-dimensional virtual object in virtual space.

Figure 1:
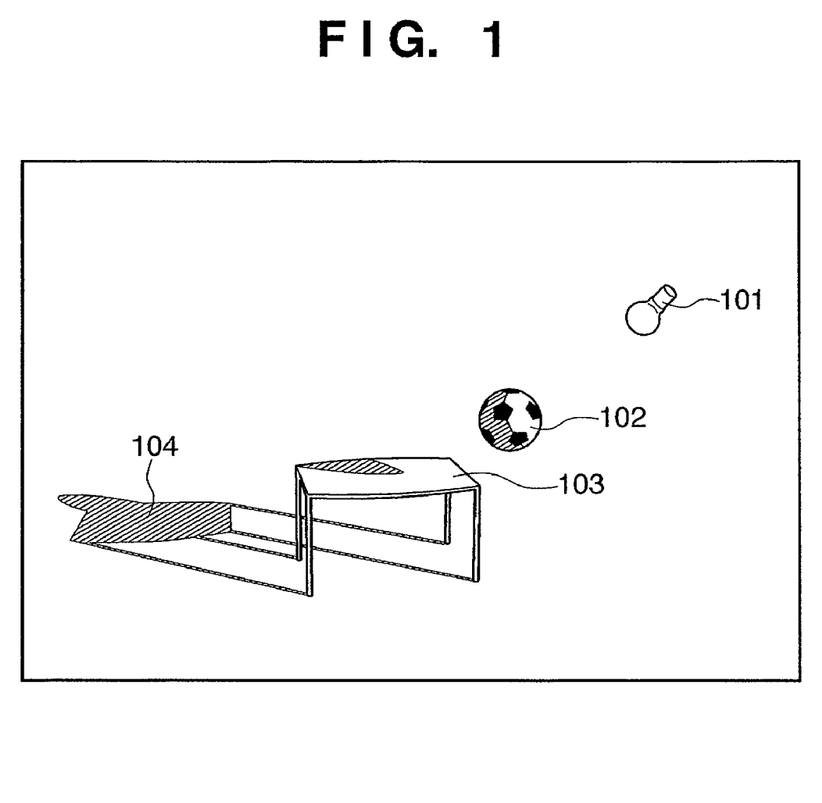
FIG. 1 is a diagram useful in describing an example of virtual space according to a first embodiment of the present invention.

FIG. 1 illustrates an example of virtual space generated by the present system. An overview of the first embodiment will be described with reference to FIG. 1.

A virtual light source 101 in virtual space is shown in FIG. 1. Model data (virtual objects) 102 and 103 have been obtained by rendering model data representing a soccer ball and desk, respectively. A virtual shadow 104 is the shadow of the model data 102 and model data 103 and is produced by the virtual light source 101.

In the first embodiment, a check for interference between the model data 102 and model data 103 in virtual space is performed and a virtual shadow of the model data 102 and model data 103 is obtained and displayed utilizing some of the collision check processing. In other words, the image processing apparatus according to this embodiment speeds up processing by using a rendering result, which is for generating shadow information of the model data in virtual space, in part of the collision check processing. Here the collision check includes interference detection processing and collision detection processing. Interference detection processing is processing in which model data in virtual space is projected upon a lower dimension (e.g., upon a coordinate axis such as the X, Y or Z axis) to thereby determine whether the items of model data overlap each other. That is, interference detection processing determines, at high speed, whether there is the possibility that the two items of model data are interfering with each other. Further, collision detection processing is for determining, in detail, whether the shapes of the items of model data are interfering with each other in consideration of the results of interference detection processing.

With the interference detection processing of this embodiment, two types of images are rendered in order to apply interference detection to the model data 102 and model data 103 with regard to the virtual space of FIG. 1. One is an image rendered using the position of the virtual light source 101 as the viewpoint, and the other is an image rendered from a vertical axis, which is the direction perpendicular to the axis of the light source. The virtual-space presentation apparatus of this embodiment utilizes the images, which have been rendered from the position of the virtual light source 101 used in the above-described collision detection processing, in the generation of the virtual shadow 104.

Figure 2:
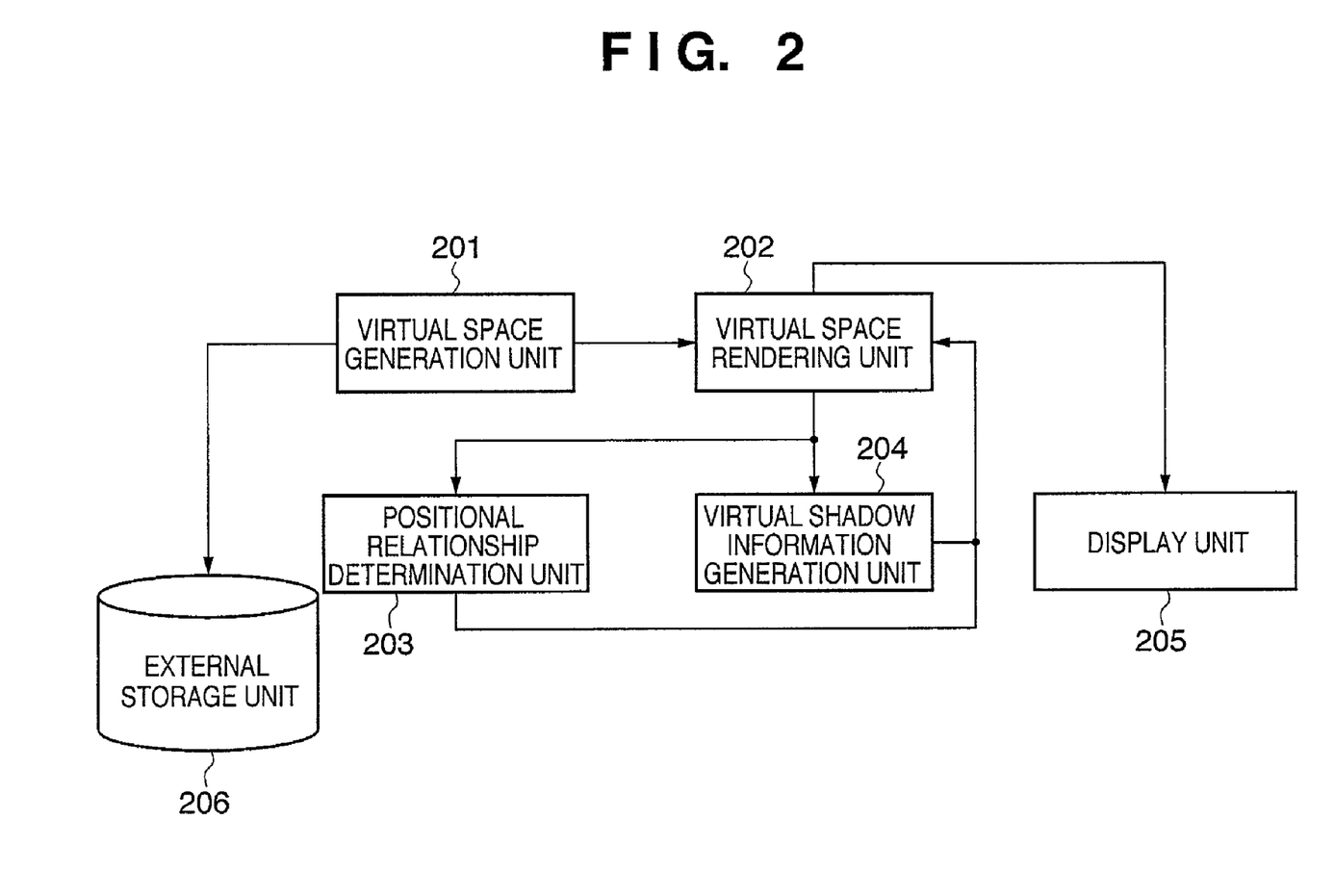
FIG. 2 is a block diagram illustrating an example of the configuration of an image processing apparatus according to the first embodiment.

FIG. 2 is a block diagram illustrating the configuration of an image processing apparatus for executing the virtual-space presentation processing according to the first embodiment. The image processing apparatus of this embodiment is implemented by installing a prescribed control program in an information processing apparatus such as a personal computer and then executing the program.

In FIG. 2, a virtual space generation unit 201 generates virtual space based upon virtual space information that has been stored in an external storage unit 206 and outputs the virtual space to a virtual space rendering unit 202. The virtual space contains model data. The virtual space rendering unit 202 renders the virtual space, which has been acquired from the virtual space generation unit 201, from a certain viewpoint and outputs the image that is the result or rendering to a positional relationship determination unit 203 and virtual shadow information generation unit 204. The virtual space rendering unit 202 acquires collision check information and virtual shadow information from the positional relationship determination unit 203 and virtual shadow information generation unit 204, performs rendering of virtual space by causing this information to be reflected in the virtual space acquired from the virtual space generation unit 201, and outputs the result to a display unit 205. Thus, the virtual space rendering unit 202 performs multi-pass rendering.

Using the image provided by the virtual space rendering unit 202, the positional relationship determination unit 203 performs a collision check between the items of model data in the virtual space and outputs the result to the virtual space rendering unit 202. It should be noted that the positional relationship determination unit 203 in this embodiment performs a collision check inclusive of collision detection that uses result of rendering in two-dimensional planes. However, this does not impose a limitation upon the present invention. As long as the processing is that which includes processing for determining the positional relationship between virtual objects utilizing the result of rendering in two-dimensional planes, any processing is applicable to the present invention. Using the image provided by the virtual space rendering unit 202, the virtual shadow information generation unit 204 generates virtual shadow information of the model data in virtual space. Here the virtual shadow information is information related to a virtual shadow required in order to display a virtual shadow in the virtual space image from the camera viewpoint. In this embodiment, a method of rendering a virtual shadow is described as one that utilizes an already existing depth buffer shadow. In a case where a depth buffer shadow is used, virtual shadow information means a shadow map. Specifically, a shadow map is a buffer that preserves a depth value of virtual space as seen from the direction of a virtual light source.

The display unit 205 displays the virtual space image acquired from the virtual space rendering unit 202. For example, a two-dimensional flat-panel display or an HMD (head-mounted display) can be used as the display unit 205.

The external storage unit 206 stores virtual space information that is necessary in order to render virtual space as three-dimensional computer graphics. Examples of such virtual space information are three-dimensional shapes of model data placed in virtual space (vertex coordinates, surface structure, ridge-line information, normal vector information, etc.), light-source information, material information, texture information and layout information, etc.

Figure 3:
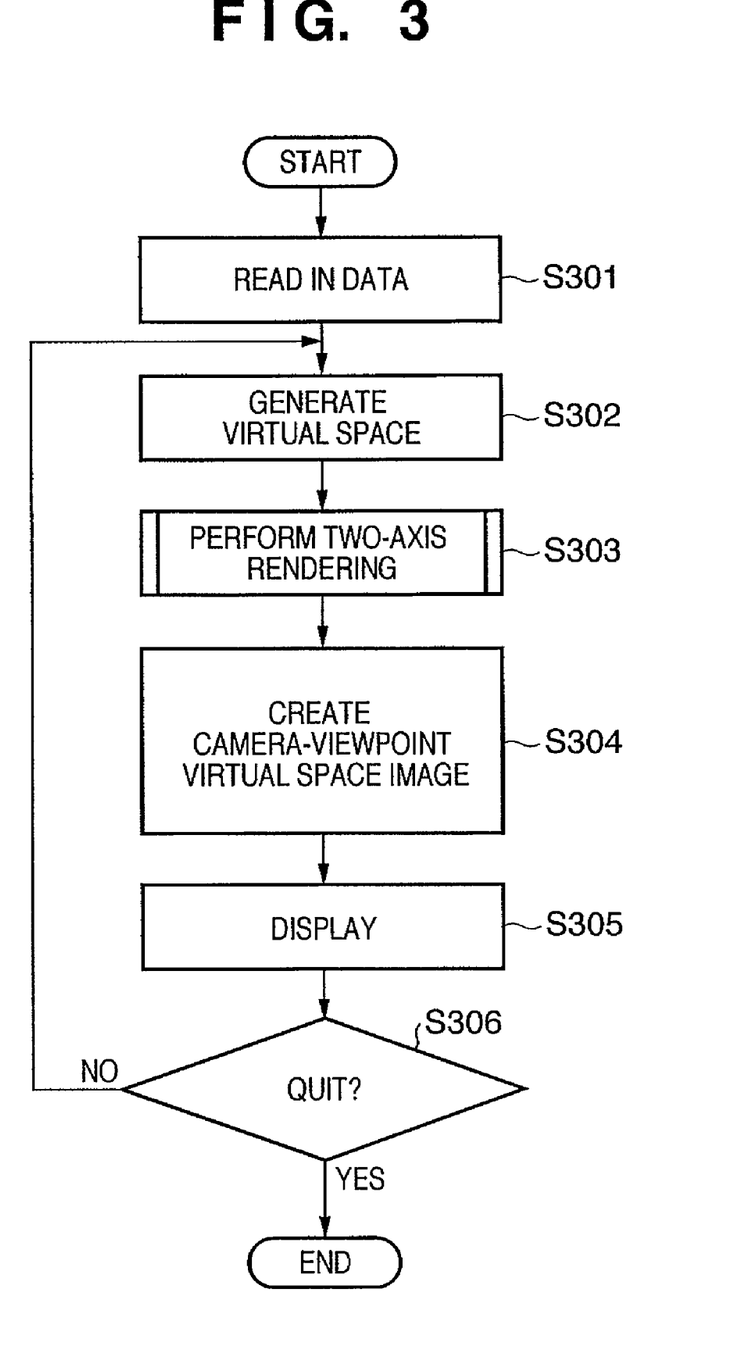
FIG. 3 is a flowchart illustrating an overview of processing executed by the image processing apparatus according to the first embodiment.

The flow of overall processing according to the first embodiment will be described with reference to FIG. 3. FIG. 3 is a flowchart illustrating main processing in virtual space presentation processing executed by the above-described processing apparatus. The control program for implementing the processing of FIG. 3 is stored in the external storage unit 206. The program is loaded in a memory (not shown) of an information processing apparatus as necessary and is executed by a CPU (not shown) of the information processing apparatus. By executing the processing illustrated in FIG. 3, the information processing apparatus operates as an information processing apparatus for presenting virtual space.

When the processing is started, the virtual space generation unit 201 reads in virtual space information, which is necessary for processing, from the external storage unit 206 in step S301. Next, in step S302, the virtual space generation unit 201 generates virtual space using the virtual space information acquired from the external storage unit 206. Then, in step S303, the virtual space rendering unit 202 acquires the virtual space generated by the virtual space generation unit 201 and renders the virtual space from two viewpoints (this is referred to as "two-axis rendering"). In addition, based on the image generated by rendering in the virtual space rendering unit 202, the positional relationship determination unit 203 and virtual shadow information generation unit 204 in step S303 execute processing to check for interference between items of model data and processing for generating virtual shadow information. The processing of step S303 will be described later in greater detail.

In step S304, the virtual space rendering unit 202 renders virtual space from the viewpoint of the camera by reflecting the results of collision check processing and virtual shadow information generation obtained in step S303. The details of the processing of step S304 will be described later.

The virtual space image created by rendering is output to the display unit 205 in step S305. That is, the display unit 205 displays the virtual space image sent from the virtual space rendering unit 202 in step S304. Then, in step S306, the image processing apparatus determines whether the user has issued a processing-quit command and quits processing if this command has been issued. If the quit command has not been issued, on the other hand, then control returns to step S302 and steps S302 to S306 are repeated.

Figure 4A:
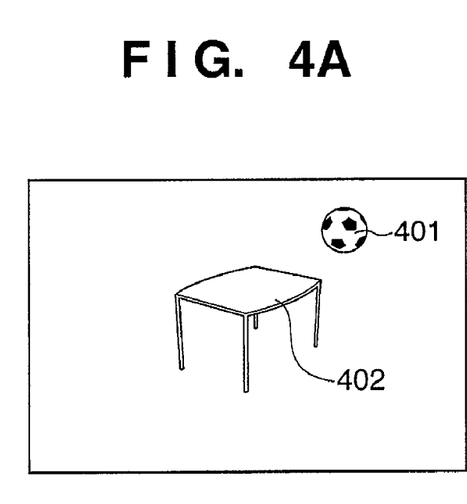
FIGS. 4A to 4C are diagrams illustrating examples of virtual space according to the first embodiment.
Figure 4B:
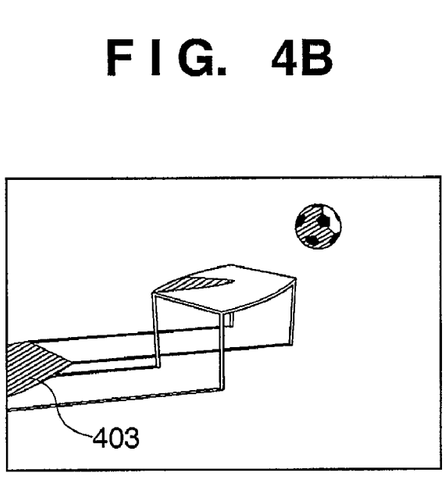
Figure 4C:
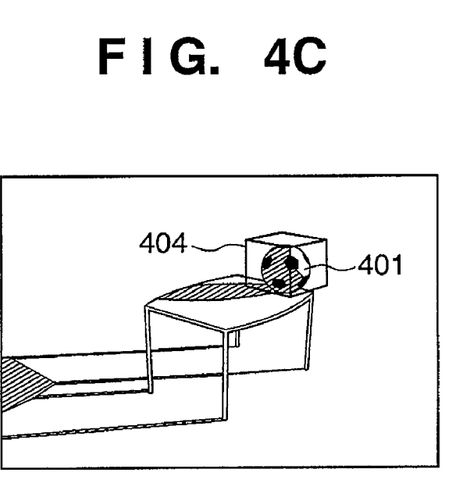

Next, the processing for rendering virtual space in step S304 will be described with reference to FIGS. 4A to 4C. FIGS. 4A to 4C are diagrams illustrating examples of virtual space presented to a user who experiences virtual space according to the first embodiment. These are virtual space images rendered from the viewpoint of the camera. FIG. 4A is a virtual space image before additional virtual space information such as virtual shadow information and result of collision check is reflected in the image. Reference numerals 401 and 402 in FIG. 4A denote model data obtained from model data that exists within virtual space. FIG. 4B is a virtual space image in which a virtual shadow 403 has been rendered. The virtual shadow 403 in FIG. 4B has been generated from the relationship among a virtual light source (not shown), the model data 401 and the model data 402 within virtual space. FIG. 4C is a diagram illustrating an example of presentation of a virtual space image in a case where interference has occurred between the items of model data. Reference numeral 404 denotes newly added model data. This data exhibits the fact that interference has occurred with respect to the model data 401.

First, a virtual shadow rendering method that reflects the result of generating virtual shadow information will be described. In this embodiment, virtual shadow rendering processing is applied to the model data in virtual space in step S304, as illustrated in FIG. 4B. According to the first embodiment, a depth buffer shadow, which is an already existing technique, is utilized as this method of rendering a virtual shadow. The virtual space rendering unit 202 acquires a shadow map, which is virtual shadow information, from the virtual shadow information generation unit 204, and performs virtual shadow casting in virtual space using the shadow map. More specifically, the virtual space rendering unit 202 maps the depth map, which has been acquired in step S303, to the virtual space of the camera viewpoint in step S304. Acquisition of the depth map (shadow map in this example) in step S303 will be discussed later. On the other hand, in relation to each pixel of an object in the virtual space image from the camera viewpoint, the distance between the object and the virtual light source is computed and the distance is adopted as the depth value of the object. Next, the value of the depth map and the depth value of the object found by computation are compared with regard to each pixel and a pixel is rendered as a shadow in a case where the value of the depth map is smaller than the depth value of the object.

Although a depth buffer shadow is used in the method of rendering a virtual shadow in the first embodiment, this does not impose a limitation upon the present invention. For example, a projected texture shadow may be used in the method of rendering a virtual shadow. That is, as long as the virtual shadow rendering method is one that utilizes the rendering result from a virtual light source, any method will suffice.

Described next will be a method of presenting the result of collision check that signifies reflection of the result of the collision check. In the first embodiment, model data for which interference has occurred in virtual space is displayed in step S304, in emphasized form to thereby present the occurrence of interference. For example, as illustrated in FIG. 4C, the new model data 404 for exhibiting interference at the position of the model data 401, where interference has occurred, is rendered by the virtual space rendering unit 202 based upon the result of collision check acquired from the positional relationship determination unit 203.

In the first embodiment, new model data is rendered as the method of presenting whether or not interference has occurred. However, this does not impose a limitation upon the present invention. For example, the invention may be adapted so as to display a bounding box of model data for which interference has occurred. That is, as long as the method is one whereby model data that is experiencing interference can be presented to a user in a recognizable manner, any method may be used. Furthermore, any method, such as giving notification of the occurrence of interference by acoustic means, will suffice as long as it is a method that makes it possible to present at least the fact that interference has occurred.

Further, in step S304, the virtual space rendering unit 202 performs rendering with synchronization between rendering of a virtual shadow and rendering of a result of a collision check. However, the present invention is not limited to this arrangement, and rendering of a virtual shadow and rendering of result of a collision check may be performed separately. It should be noted that "synchronization" refers to updating rendering and updating the collision check computations at the same timing. Accordingly, in a case where synchronization is adopted, if the collision check computations take time, then updating of rendering also will take longer. However, an advantage of synchronization is that if interference is found as the result of rendering, then it can always be determined that the result of the collision check is interference. On the other hand, in a case where synchronization is not adopted, even though the collision check computations may take time, rendering is updated irrespective of this fact. However, a disadvantage is that even if interference is found as the result of rendering, there is the possibility that the result of the collision check will not yet be recognition of interference.

Described next will be the details of two-axis rendering processing of step S302, namely processing for the check of interference between items of model data and processing for generating virtual shadow information in virtual space by performing rendering from two viewpoints.

Figure 5:
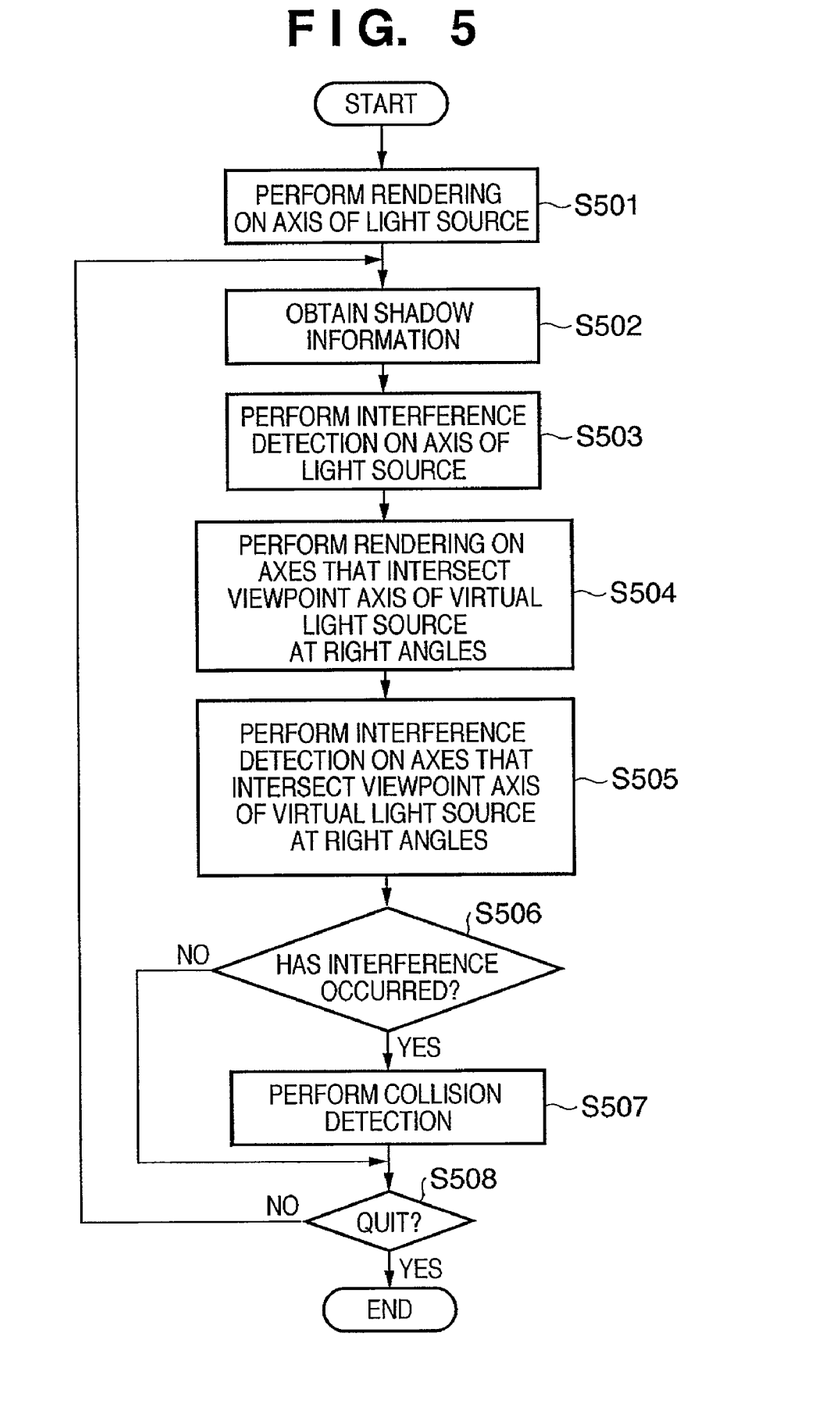
FIG. 5 is a flowchart illustrating the flow of rendering processing from two viewpoints according to the first embodiment.

FIG. 5 is a flowchart illustrating the details of the processing executed in step S303.

When the processing is started, the virtual space rendering unit 202 performs rendering of virtual space in step S501 using the position of the virtual light source as the viewpoint (this is rendering along the axis of the light source). That is, the virtual space rendering unit 202 renders a plurality of virtual objects in a plane with the axis through the virtual light source (the viewpoint axis of the virtual light source) serving as the normal. Based on the image obtained by the rendering in step S501, the virtual shadow information generation unit 204 creates a shadow map as virtual shadow information. Depth values of virtual space as viewed from the viewpoint of the virtual light source are recorded in the shadow map. The shadow map created is used in the processing for rendering the virtual shadow in step S304. Thus, shadow information of a plurality of rendered virtual objects is obtained in step S502.

Using the image obtained by rendering in step S501, the positional relationship determination unit 203 determines the positional relationship among the plurality of virtual objects in step S503. In this embodiment, interference detection is carried out to determine whether or not the items of model data are overlapping one another as viewed from the viewpoint of the virtual light source. More specifically, interference detection applied to model data that has been rendered in a two-dimensional plane is executed. An ordinary interference detection technique may be used in this processing for interference detection. For example, model data that has been rendered in a two-dimensional plane can be projected upon a one-dimensional axis and interference can be detected from the relationship between maximum and minimum values of each item of model data on this axis.

Figure 6A:
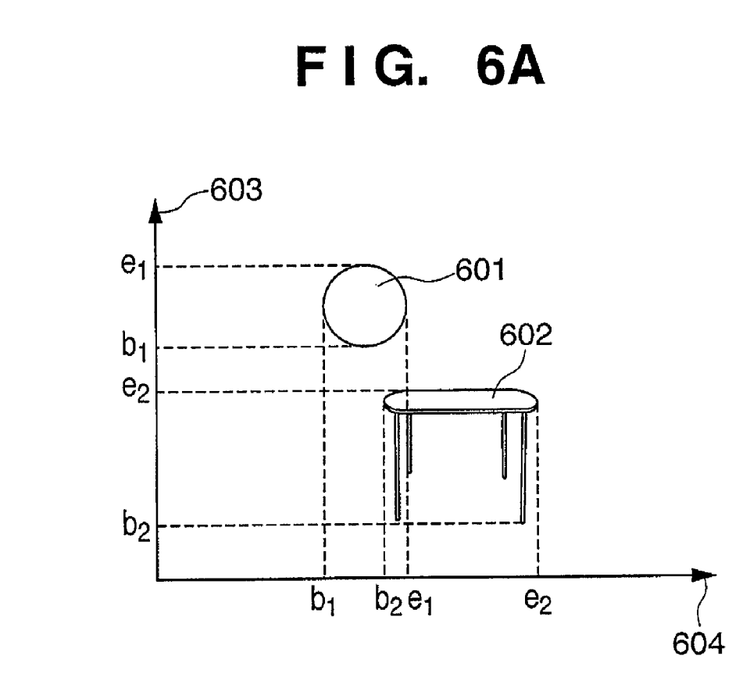
FIGS. 6A and 6B are diagrams for describing interference detection according to the first embodiment.

Processing for interference detection in step S503 will be described with reference to FIG. 6A. FIG. 6A is a diagram illustrating an example of a virtual space image that has been rendered from the viewpoint of the virtual light source. Reference numerals 601 and 602 in FIG. 6A denote model data representing a ball and desk, respectively.

Shown in FIG. 6A are a minimum value b1 when the model data 601 has been projected on one dimension and a maximum value e1 when the model data 601 has been projected on one dimension. Similarly shown are minimum value b2 when the model data 602 has been projected on one dimension and a maximum value e2 when the model data 602 has been projected on one dimension. A vertical axis 603 and a horizontal axis 604 in FIG. 6A, which have been set in a two-dimensional plane, are axes that intersect the viewpoint axis of the virtual light source at right angles. The vertical axis 603 and horizontal axis 604 are mutually perpendicular.

In the projection of data in one dimension, the items of model data 601, 602 that have been rendered from the viewpoint of the virtual light source are each projected one-dimensionally onto the horizontal axis 604 and vertical axis 603 of the image. The maximum and minimum values of the shapes of the models are found. The maximum and minimum values of each model are the points at the extremities of each model on the projection axes.

Interference detection processing is executed by comparing the relationships of the maximum and minimum values of each of the models that have been projected onto the axes. Specifically, when the following holds with regard to each axis:

b1>e2 or b2>e1 this means that the models are spaced apart along the axis and, hence, it can be determined that there is no interference. If this determination is made along each axis and interference is detected with regard to all axes, then it is determined that interference exists. If there is no interference with regard to even one axis, then a final determination is made that no interference exists.

For example, in the case of FIG. 6A, interference is observed on the horizontal axis 604 but not on the vertical axis 603. Therefore, it is determined that there is no interference between the model data 601 and model data 602. The foregoing is the description regarding the interference detection processing of step S503.

Next, in step S504, the virtual space rendering unit 202 performs rendering of virtual space from axes that intersect the viewpoint axis of the virtual light source at right angles. Using the result of rendering performed in step S504, the positional relationship determination unit 203 performs interference detection in step S505. In other words, the positional relationship determination unit 203 determines whether the models are overlapping each other as viewed from axes intersecting the viewpoint axis of the virtual light source at right angles.

Figure 6B:
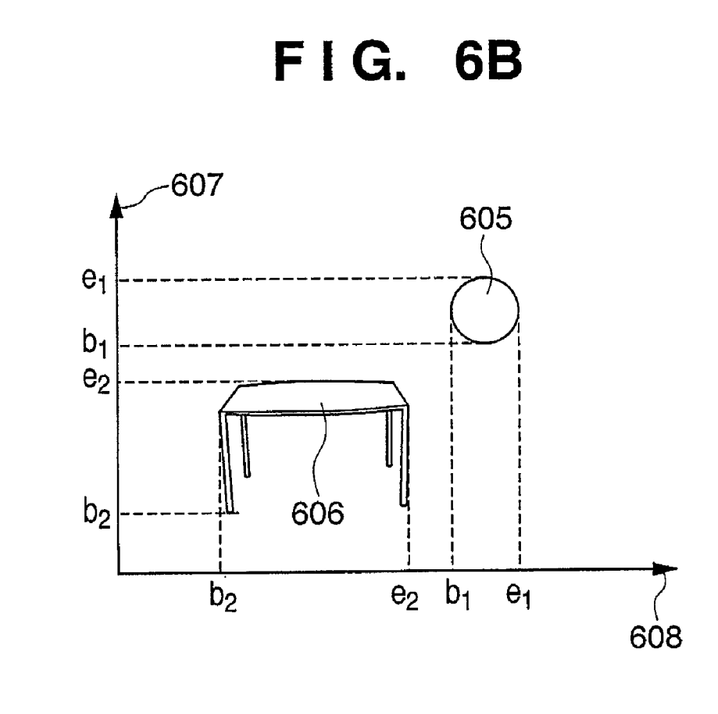

FIG. 6B is a diagram illustrating an example of a virtual space image that has been rendered from axes that intersect the viewpoint axis of the virtual light source at right angles. Reference numerals 605 and 606 in FIG. 6B denote model data representing a ball and desk, respectively. Shown in FIG. 6B are minimum value b1 when the model data 605 has been projected on one dimension, maximum value e1 when the model data 605 has been projected on one dimension, minimum value b2 when the model data 606 has been projected on one dimension and maximum value e2 when the model data 606 has been projected on one dimension. Reference numerals 607 and 608 represent axes perpendicular to the axes (603 and 604) that intersect the viewpoint axis of the virtual light source at right angles. The axes 607 and 608 are mutually perpendicular.

Interference detection in step S505 is similar to that in step S503. In step S506, the positional relationship determination unit 203 refers to the results of interference detection performed in steps S503 and S505. In this embodiment, interference is determined to have occurred, and processing proceeds from step S506 to step S507, only in a case where interference between objects has been detected to exist in interference detection on both of the two axes. Interference is determined not to exist, and processing proceeds to step S508, in other cases.

The positional relationship determination unit 203 performs collision detection between models in virtual space at step S507. An ordinary collision detection method can be used in this collision detection. For example, it is possible to perform the collision detection using the method of Gilbert et al. (see E. G. Gilbert, D. W. Johnson and S. S. Keerthi, IEEE Journal of Robotics and Automation, Vol. 4, No. 2, pp. 193-203, 1988).

Finally, in step S508, it is determined whether the user has issued a command to quit processing. This processing is exited if the quit command has been issued. If the quit command has not been issued, processing returns to step S501 and the processing of steps S501 to S508 is repeated. The foregoing is a description of the flow of processing according to the first embodiment.

Although the target of rendering to undergo interference detection is model data in the first embodiment, the invention is not limited to this. For example, the target to undergo interference detection may be a bounding volume created beforehand from model data. That is, in collision detection, as long as the method is one that can determine the possibility of whether or not there is interference between items of model data, any kind of object may be used. Here a bounding volume is a volume that encompasses model data and basically is a simplification of model data. For example, bounding volumes include an AABB (Axis-Aligned Bounding Box), OBB (Oriented Bounding Box) and Convex Hull. Interference detection can be executed more quickly and reliably when applied to a bounding volume of model data than when applied to model data. A bounding volume is preferred for this reason. In other words, if it is unnecessary for the shape of a virtual shadow to be in detail, as in model data, then a bounding volume such as an AABB or OBB of the model data may be rendered in step S501 or S504 and interference detection may be carried out using the result of this rendering.

Thus, in accordance with the method of presenting virtual space in the first embodiment, as described above, the result of rendering can be shared by processing for generating virtual shadow information and processing for interference detection. A check of interference between objects having a three-dimensional shape in virtual space and rendering of virtual shadows of these three-dimensional objects, therefore, can be performed very efficiently.

In the first embodiment, rendering is performed from two viewpoints that include the viewpoint of a virtual light source in order to execute processing for interference detection, and virtual shadow information is generated using the rendering result from the viewpoint of the virtual light source. However, this does not impose a limitation upon the present invention. For example, rendering may be performed from three or more viewpoints that include the viewpoint of a virtual light source in order to execute processing for interference detection. Further, it may be so arranged that the result of rendering from the viewpoints of a plurality of virtual light sources is included in the result of rendering from a plurality of viewpoints used in interference detection, and it may be so arranged so that virtual shadow information is generated using the rendering result from the viewpoints of the plurality of virtual light sources in the processing for generating a virtual shadow.

Further, in the first embodiment, interference detection is executed utilizing the result of rendering in a plane to which the axis passing through the virtual light source is a normal line and in a plane to which the axis that intersects the axis passing through the virtual light source at right angles is a normal line. That is, interference detection is carried out using a rendering result obtained by placing the viewpoints on two axes that intersect at right angles. However, the planes in which rendering is performed (the axes on which the viewpoints are to be placed) are not limited to such a combination. For example, it is permissible to use a rendering result in which a viewpoint is placed on an axis that intersects the axis that passes through the viewpoint of the virtual light source, or a rendering result from the viewpoint of the virtual light source and any camera viewpoint, and hence it is not essential that the viewpoint axes of rendering intersect at right angles. As an example of a rendering result from any camera viewpoint, it is possible to use a rendering result from a direction that coincides with a specific line-of-sight direction to be finally rendered by the virtual space rendering unit 202. From the standpoint of accuracy of interference detection, it is preferred that use be made of a rendering result on two planes to which two axes that intersect at right angles are normal lines.

Further, in the first embodiment, rendering from the viewpoint of the virtual light source is performed in order to execute processing for interference detection and processing for generating virtual shadow information. However, this does not impose a limitation upon the present invention. It may be so arranged that rendering is performed from a viewpoint at a position other than that of the virtual light source and the processing for interference detection and processing for generating virtual shadow information is executed based upon the result of this rendering. That is, it is permissible to set a provisional virtual light source for creating a false shadow.

In accordance with the first embodiment, as described above, rendering processing required in the generation of virtual shadow information for shadow casting and part of the processing for interference detection, which is one processing in a collision check, are shared. As a result, it is possible to execute computational processing at high speed even in a case where joint use is made of shadow-casting processing and collision check processing.

[Second Embodiment]

In the first embodiment, interference detection is applied to rendered model data or a rendered bounding volume (a bounded volume created prior to rendering). In this case, if use is made of a bounded volume created prior to rendering, the processing for interference detection can be executed at higher speed but the shape of the virtual shadow that will be produced will be the shape of the bounded volume. Accordingly, in a second embodiment, a bounded volume is calculated, in order to perform interference detection, from the result of rendering model data, and interference detection is carried out using this bounded volume. Processing according to the second embodiment is capable of being implemented by adding processing, which is for creating the bounded volume from model data, to the processing for interference detection in steps S503 and S505 in the first embodiment.

In accordance with the second embodiment, shape information in the form of the model data as is can be obtained as the rendering result and therefore it is possible to generate a virtual shadow that reflects the shape of the model data. Furthermore, since interference detection is carried out with regard to a bounded volume of model data, interference detection can be performed at higher speed.

[Third Embodiment]

In the first embodiment, processing for interference detection is executed using results of rendering from the positions of a plurality of viewpoints. In a third embodiment, processing for interference detection and processing for generating virtual shadow information is executed using only one rendering result from the viewpoint of the virtual light source.

The third embodiment differs from the first embodiment in the processing executed in steps S503 to S506. In the third embodiment, the processing of steps S504 and S505 is eliminated and therefore only the processing of steps S503 and S506 will be described below.

In step S503, the positional relationship determination unit 203 executes interference detection using the result of rendering performed in step S501. In other words, whether or not the objects are overlapping each other as seen from the viewpoint of the virtual light source is determined, as described above in conjunction with FIG. 6A.

The processing of step S503 in this embodiment differs from that of step S503 in the first embodiment in the number of axes onto which a one-dimensional projection is made. In interference detection according to the first embodiment, a one-dimensional projection is made upon two axes of the image, namely the horizontal axis 604 and the vertical axis 603. In the third embodiment, however, the number of axes is increased by one and a one-dimensional projection is made upon three axes. The three axes are x, y and z axes in the local coordinate system of the virtual light source, by way of example.

Figure 7:
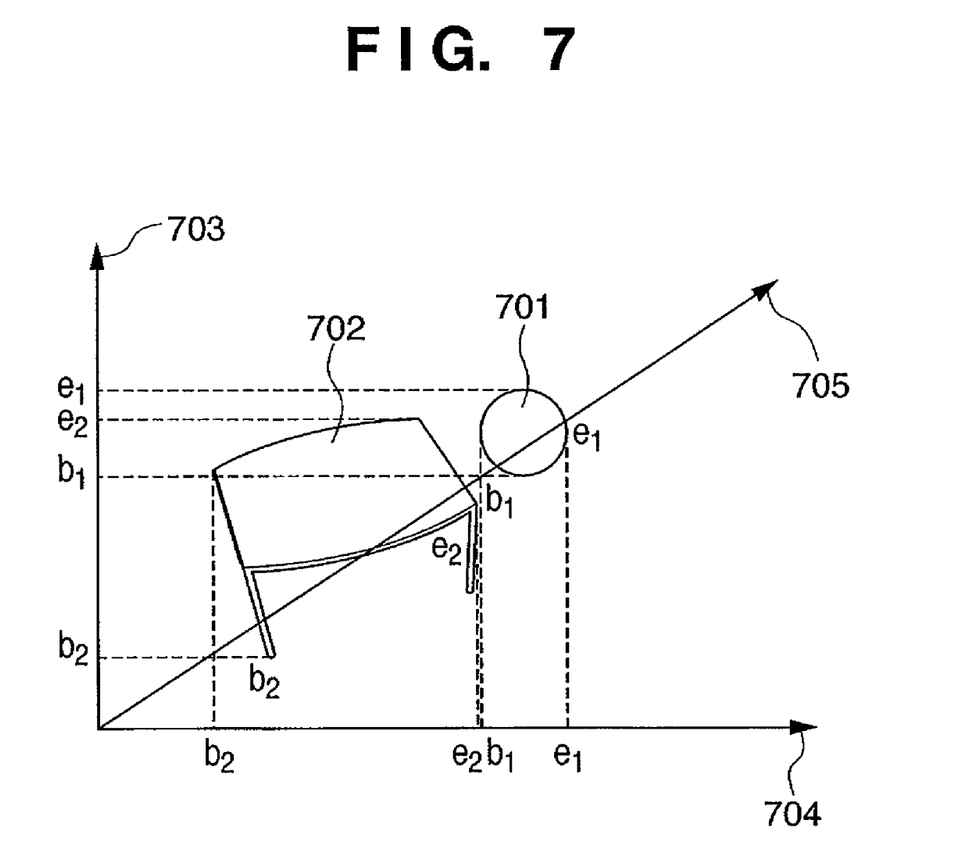
FIG. 7 is a diagram for describing interference detection according to a third embodiment of the present invention.

The processing for interference detection in step S503 in the third embodiment will be described with reference to FIG. 7. FIG. 7 is a diagram illustrating an example of a virtual space image that has been rendered from the viewpoint of the virtual light source. Reference numerals 701 and 702 in FIG. 7 denote model data representing a ball and desk, respectively. Shown in FIG. 7 are minimum value b1 when the model data 701 has been projected on one dimension, maximum value e1 when the model data 701 has been projected on one dimension, minimum value b2 when the model data 702 has been projected on one dimension and maximum value e2 when the model data 702 has been projected on one dimension. The axes 703 and 704 are axes that intersect the viewpoint axis of the virtual light source at right angles, and these axes are mutually perpendicular. An axis 705 is the viewpoint axis of the virtual light source. Further, a projection upon the axis 705 can be acquired by referring to a depth buffer or color buffer.

In the third embodiment, each of the items of model data rendered from the viewpoint of the virtual light source is projected one-dimensionally onto three axes. It should be noted that the projections upon the axes 703 and 704 are similar to those in the first embodiment, and that the projection upon the axis 705 can be implemented using a depth buffer. The maximum and minimum values of each model on each axis are found. Interference detection is executed by comparing the relationships of the maximum and minimum values of each of the models that have been projected onto each of the axes. Specifically, when the following holds with regard to each axis:

b1>e2 or b2>e1 this means that the models are spaced apart along the axis and, hence, it can be determined that there is no interference. If this determination is made with regard to all three of the axes and interference is detected with regard to all axes, then it is determined that interference exists. If there is no interference with regard to even one axis, then a final determination is made that no interference exists.

Thus, in accordance with the third embodiment, the number of times interference detection is performed declines in comparison with interference detection according to the first embodiment. Although the accuracy of interference detection declines as a consequence, the rendering load is alleviated.

Although interference detection is performed by projecting model data upon three axes in the third embodiment, this does not impose a limitation. That is, interference detection can be carried out by projecting model data upon three or more axes or upon less than three axes. The larger the number of intersecting axes (axes upon which projections are made), the more the accuracy of detection rises. Further, interference detection is possible with just one axis, although accuracy in such case is low. Since there is a tradeoff relationship between the accuracy of interference detection and the speed of processing, it may be so arranged that interference detection is executed upon setting the number of intersecting axes.

The flow of processing according to the third embodiment has been described above. In accordance with the third embodiment, one rendering result from the viewpoint axis of a virtual light source is generated and this result is shared by processing for generating virtual shadow information and processing for interference detection. A check of interference between objects having a three-dimensional shape in virtual space and rendering of virtual shadows of these three-dimensional objects, therefore, can be performed very efficiently.

Thus, in accordance with each of the embodiments set forth above, it is arranged to utilize rendering for the generation of a virtual shadow in other image processing, or to utilize rendering for interference detection in other image processing. This makes possible the high-speed execution of a plurality of processes that utilize a rendering result.

[Fourth Embodiment]

Thus, the virtual space rendering unit 202 has the following two functions:

(1) it outputs the result of rendering in virtual space from a certain viewpoint to the positional relationship determination unit 203 and virtual shadow information generation unit 204; and (2) it outputs the result of rendering in virtual space from a camera viewpoint to the display unit 205, in which this result reflects the result of collision check and the virtual shadow information obtained from the positional relationship determination unit 203 and virtual shadow information generation unit 204.

In the first to third embodiments, the above-mentioned two functions of the virtual space rendering unit 202 are implemented by a single information processing apparatus. However, this does not impose a limitation. In a fourth embodiment, a unit for implementing function (1) of the virtual space rendering unit 202 (the unit is referred to as an "arbitrary-viewpoint virtual space rendering unit") and a function for implementing function (2) of the virtual space rendering unit 202 (the unit is referred to as "camera-viewpoint virtual space rendering unit") are each implemented by a separate information processing apparatus.

In the case of the fourth embodiment, it is required that virtual space generated by the virtual space generation unit 201, virtual shadow information generated by the virtual shadow information generation unit 204 and result of collision check by the positional relationship determination unit 203 be output to the camera-viewpoint virtual space rendering unit. When virtual space, the result of collision check and the virtual shadow information are output to the information processing apparatus having the camera-viewpoint virtual space rendering unit, it is preferred that these be output upon being compressed. For example, in a case where the virtual shadow information is a shadow map, it will suffice if the shadow map is compressed in the same manner that an ordinary frame buffer is compressed.

[Other Embodiments]

Although embodiments of the present invention have been described, the present invention can also take on the form of a system, apparatus, method, program or storage medium, etc. Specifically, the invention may be applied to a system constituted by a plurality of devices or to an apparatus comprising a single device.

Furthermore, the present invention covers a case where the functions of the embodiments are attained also by supplying a software program directly or remotely to a system or apparatus, reading the supplied program codes with a computer of the system or apparatus, and then executing the program codes. In this case, the program supplied is a program corresponding to the flowcharts illustrated in the drawings of the embodiments.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, for example, object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention can be downloaded to a recording medium such as a hard disk. In this case, the program downloaded may be a file that is compressed and contains an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also are covered by the present invention.

Further, it is also possible to encrypt and store the program of the present invention on a storage medium such as a CD-ROM and distribute the storage medium to users. In this case, users who meet certain requirements are allowed to download decryption key information from a website via the Internet, the program decrypted using this key information can be executed and the program can be installed on a computer.

Further, besides implementing the functions of the embodiments by executing a read program using a computer, the functions of the embodiments may be implemented in cooperation with an operating system running on a computer, based upon commands from the program. In this case, the operating system, etc., executes some or all of the functions of actual processing and the functions of the above-described embodiments are implemented by this processing.

Furthermore, a program that has been read from a recording medium may be written to a memory provided on a function expansion board inserted into the computer or provided in a function expansion unit connected to the computer, and some or all of the functions of the embodiments may be implemented. In this case, after the program has been written to the function expansion board or function expansion unit, a CPU or the like provided on the function expansion board or function expansion unit performs some or all of the actual processing based upon the indications in the program.

In accordance with the present invention, a plurality of processes that utilize the results of rendering can be executed at high speed. In particular, a collision check among objects having three-dimensional shapes and rendering of a virtual shadow of these three-dimensional objects can be performed efficiently, and computational processing can be executed at high speed even in a case where a shadow-casting function and collision check function are used conjointly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-075398, filed Mar. 22, 2007, which is hereby incorporated by reference herein in its entirety.

What is claimed is:

1. A method of controlling an image processing apparatus for determining a positional relationship among virtual objects in virtual space and generating a virtual shadow of the virtual objects, said method comprising:
   a first rendering step of rendering a plurality of virtual objects in a first plane to which a first axis passing through a virtual light source is normal;
   a determining step of determining an interference among the plurality of virtual objects based upon a rendering result acquired at said first rendering step; and
   a generating step of generating shadow information of the plurality of virtual objects based upon the rendering result acquired at said first rendering step,
   wherein the rendering result is shared by said determining step and said generating step, and the determining step and the generating step are executed in parallel.

2. The method according to claim 1, further comprising a second rendering step of rendering the plurality of virtual objects in a second plane to which a second axis different from the first axis is normal;
   wherein the positional relationship among the plurality of virtual objects is determined at said determining step based upon the rendering results acquired at said first and second rendering steps.

3. The method according to claim 2, wherein the first and second axes intersect each other.

4. The method according to claim 2, wherein the first and second axes intersect each other at right angles.

5. The method according to claim 2, further comprising a third rendering step of rendering virtual space from a specific line-of-sight direction based upon the shadow information generated at said generating step and the positional relationship that has been determined at said determining step, wherein direction of the second axis coincides with the line-of-sight direction.

6. The method according to claim 1, wherein each of the plurality of virtual objects is rendered in the first plane at said first rendering step using a bounding volume.

7. The method according to claim 1, wherein said determining step includes calculating a bounded volume with regard to the plurality of virtual objects rendered at said first rendering step and determining the positioning relationship among the plurality of virtual objects using the bounded volume calculated.

8. The method according to claim 1, wherein interference detection is performed at said determining step based upon results of projecting the plurality of virtual objects onto each of two mutually perpendicular axes, which have been set in the first plane, and the first axis.

9. An image processing apparatus for determining a positional relationship among virtual objects in virtual space and generating a virtual shadow of the virtual objects, said apparatus comprising:

a first rendering unit configured to render a plurality of virtual objects in a first plane to which a first axis passing through a virtual light source is normal;

a determining unit configured to determine the interference among the plurality of virtual objects based upon a rendering result acquired at said first rendering unit; and a generating unit configured to generate shadow information of the plurality of virtual objects based upon the rendering result acquired by said first rendering unit, wherein the rendering result is shared by said determining unit and said generating unit, and said determining unit and said generating unit operate in parallel.

10. A non-transitory computer-readable storage medium storing a program for causing a computer to execute the method of controlling an image processing apparatus set forth in claim 1.

* * * * *